United States Patent [19]

Yaginuma et al.

[11] Patent Number: 5,088,017
[45] Date of Patent: Feb. 11, 1992

[54] DC-DC CONVERTER AND A COMPUTER USING THE CONVERTER

[75] Inventors: Takao Yaginuma, Hitachiota; Kenichi Onda, Hitachi, both of Japan; Yasuo Matsuda, Eastchester, N.Y.; Kouichi Mizuta, Hadano, Japan

[73] Assignee: Hitachi, Ltd., Tokyo, Japan

[21] Appl. No.: 540,789

[22] Filed: Jun. 20, 1990

[30] Foreign Application Priority Data
Jun. 21, 1989 [JP] Japan ................ 1-156788

[51] Int. Cl.⁵ ........................... H02M 3/335
[52] U.S. Cl. ......................... 363/21; 363/56; 363/65
[58] Field of Search .......... 363/20, 21, 56, 65, 363/97, 131

[56] References Cited

U.S. PATENT DOCUMENTS

| | | | |
|---|---|---|---|
| 4,336,587 | 6/1982 | Boettcher, Jr. et al. | 363/134 |
| 4,438,486 | 3/1984 | Ferraro | 363/56 |
| 4,607,322 | 8/1986 | Henderson | 363/56 |
| 4,809,148 | 2/1989 | Barn | 363/56 |

FOREIGN PATENT DOCUMENTS 0612367 5/1978 U.S.S.R. .................. 363/132

Primary Examiner—Peter S. Wong
Attorney, Agent, or Firm—Antonelli, Terry, Stout & Kraus

[57] ABSTRACT

In order to provide miniaturization and increased-frequency operation of a DC-DC converter used with a computer, etc., a capacitor is connected in parallel with a switching element when the switching element is turned off to reduce turn-off loss. When the switching element is turned on, the capacitor and a DC power source are connected in series to supply the energy stored in the capacitor to a load circuit to result in a high initial voltage being applied across the load circuit.

27 Claims, 12 Drawing Sheets

DC-DC CONVERTER AND A COMPUTER USING THE CONVERTER

BACKGROUND OF THE INVENTION

The present invention relates to DC-DC (Direct Current-Direct Current) converters and more particularly to a snubber circuit and a miniaturized switching circuit to perform an increased-frequency and increased-efficiency operation, and also to computers including such a DC-DC converter for weight reduction.

Miniaturization is the most important subject in a DC-DC converter in which a DC voltage source, a load and switching elements are connected in series, power being supplied to the load by turning on and off the switching elements. One means effective for realizing miniaturization provides an increased-frequency circuit operation to thereby miniaturize passive parts such as ceramic parts, capacitors, etc.

One known example of a miniaturized DC-DC converter which is directed to an increased-frequency operation is disclosed in FIG. 1 in which reference numeral 3 denotes a DC voltage source; 41, 42, a source dividing capacitor; 51, 52, a MOS FET; 191, 192, a charging and discharging snubber; 18, a transformer; 91, 92, a rectifying diode; 11, an output smoothing reactor; 12, an output smoothing capacitor; and 33, a load.

Factors which hinder the provision of an increased-frequency operation and miniaturizing of the DC-DC converter will be described.

A first factor is switching loss which increases in proportion to frequency. Thus, as the frequency increases, a cooling fan for the switching elements becomes large-scaled to thereby render it difficult to miniaturize the converter. In the conventional art, a turn-off loss in the switching elements is reduced by connecting the switching elements, which are MOS FETs 51 and 52, with charging and discharging snubber circuits 191 and 192, each comprising a resistor, a capacitor and a diode, connected in parallel with MOS FETs 51 and 52, respectively, to thereby realize an increased frequency operation and miniaturization. In this example, there is the problem that the snubber circuits are not lossless and that the energy stored by the capacitors is consumed by the resistors to generate a large loss, so that the converter using such snubber circuits has resistors increasing in size as the frequency handled increases to thereby render it difficult to miniaturize the converter. In addition, the power source efficiency is low.

A second factor hindering an increased frequency operation and miniaturization of the converter is a decrease in the maximum on-duty due to the presence of a second side overlap interval. When the output smoothing circuit has a choke input type structure, as shown in FIG. 1, commutation on the secondary side of the transformer is suppressed and generated slowly by a leakage inductance in the transformer, a lead inductance, etc., directly after the switching elements are turned on, and hence the secondary side of the transformer is shortcircuited for a particular interval of time, which is referred to as a secondary side overlap interval during which no power is transmitted to the load in spite of the switching elements being on. In the DC-DC converter having a choke input type output smoothing circuit, the percentage of the secondary side overlap interval occupied in the operation period increases as the frequency increases to thereby reduce the maximum on-duty. Therefore, the number of turns of the transformer windings is required to be set to a low value in order to ensure the output voltage in the case of the minimum input voltage and maximum load current. As a result, the primary side conversion value of the load current increases to also increase the loss in the primary side circuit to thereby increase the size of the cooling fan, to reduce the density of attached parts and hence to render it difficult to achieve a reduced size converter. The above conventional technique does not contemplate such points, and an increased-frequency operation and miniaturization of the converter is difficult. This problem becomes larger as the frequency increases, as the voltage output is decreased, or as the current output increases.

A third factor is a decrease in the maximum on-duty due to the presence of a dead time for prevention of a short circuit of the power source. In a closed loop comprising direct current voltage source 3 and two switching elements 51 and 52, as shown in FIG. 1, the power source is short-circuited if the switching elements 51 and 52 are turned on simultaneously. In this case, there is a probability that an excessive current flows through the switching elements to thereby destroy the elements. In order to prevent such short-circuiting of the power source, a dead time is provided between two on-signals such that the switching elements are never rendered conductive simultaneously even if there are variations in the circuit characteristics including the switching element characteristics. Usually, the dead time is set to a value similar to the turn-off time of the elements. For example, in a 500V-30A class MOS FET, the dead time is required to be about 1 $\mu s$. When the elements are operated at a switching frequency of 200 kHz using the FIG. 1 circuit, the dead time would occupy about 40% of a half period. Thus, the maximum on-duty decreases, so that the number of turns of the transformer windings is required to be reduced, as mentioned above, in order to ensure the output voltage at the minimum input voltage and maximum load current. As a result, the primary side conversion value of the load current increases, the loss in the primary side circuit increases, the cooling fan becomes large-sized, the density of attached parts is reduced, and miniaturization of the converter becomes difficult. The conventional techniques do not contemplate those points and hence an increased-frequency operation and miniaturization of the converter is difficult.

As described above, the main factors which hinder the high frequency operation and miniaturization of the DC-DC converters are an increase in the switching loss, a decrease in the maximum on-duty due to the secondary side overlap interval and a decrease in the maximum on-duty due to the dead time for prevention of source short-circuiting.

SUMMARY OF THE INVENTION

It is an object of the present invention to provide a DC-DC converter which has a reduced switching loss, a reduced secondary side overlap interval, elimination of a dead time for prevention of power source short-circuiting, and realizes an increased frequency operation, miniaturization and an increased efficiency of the converter.

The above object is achieved by a DC-DC converter which comprises a circuit of two or more series connected capacitors being in parallel with a DC voltage source, each capacitor being connected to a single end forward converter in which the primary winding of a transformer and a switching element are connected in series with the capacitor, wherein power is supplied to the load from the secondary winding of the transformer by turning on and off the switching element such that the capacitor operates as a DC voltage source. In the forward converter, a capacitor of a snubber circuit is connected in parallel with the switching element when the same is turned off while the capacitor is connected in series with the capacitor of the snubber circuit such that the respective voltages across the capacitors are combined additively when the switching element is turned on.

When the switching element is off, the capacitor of the snubber circuit is connected in parallel with the switching element, so that the turn-off loss of the switching element is reduced. The energy stored in the capacitor of the snubber circuit is transmitted to the load when the switching element is off, so that no loss is produced.

At an early turn-on stage of the switching element, a high voltage comprising the sum of the voltages across the capacitor operating as the DC source and across the capacitor of the snubber circuit is applied across the primary winding of the transformer of the single end forward converter. Thus, the rate of an increase in the primary side current increases to accelerate commutation on the secondary side to thereby reduce the secondary side overlap interval of the transformer.

The circuit of two or more series connected capacitors is connected in parallel with the DC voltage source. A single end forward converter is connected to each capacitor such that the capacitor operates as a DC voltage source. Even if the switching elements of the respective converters are turned on simultaneously, no source short-circuiting occurs because a closed loop comprising the DC voltage source and the switching elements includes the load inserted therein. Thus, no dead time for prevention of source short-circuiting is required.

Thus, an increased frequency operation, miniaturization and an increased efficiency operation of the DC-DC converter is realized which reduces the switching loss and the secondary side overlap interval and eliminates the dead time for prevention of source short-circuiting.

DESCRIPTION OF THE PREFERRED EMBODIMENTS

The details of the embodiments of the present invention will be described hereinafter.

One embodiment of the present invention will be described with reference to FIGS. 2 to 4A-4C.

Figure 1:
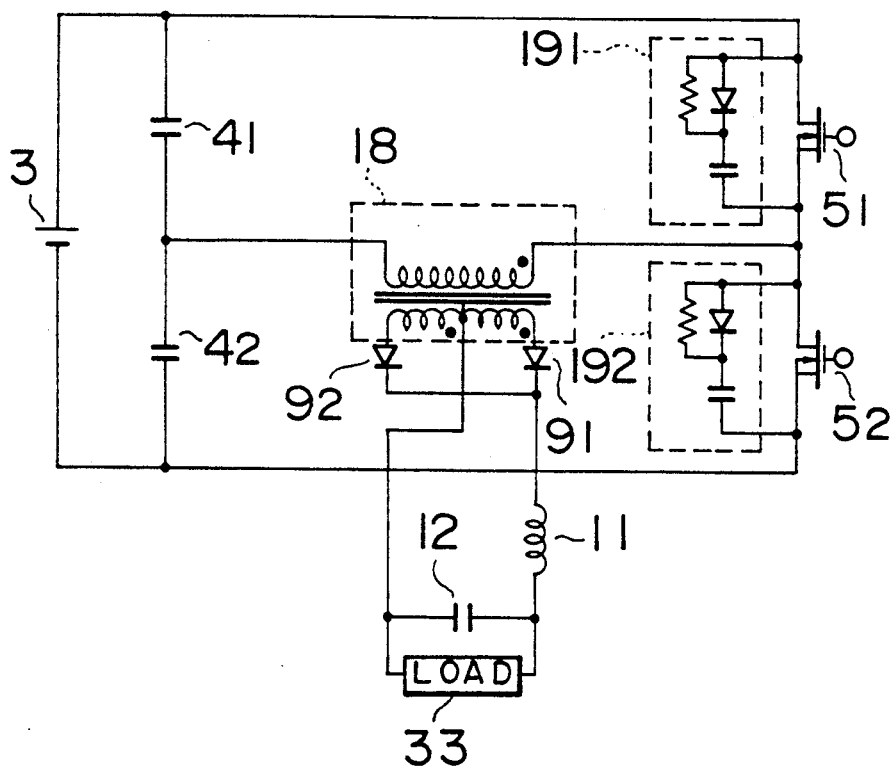
FIG. 1 is a circuit schematic of a conventional converter circuit.
Figure 2:
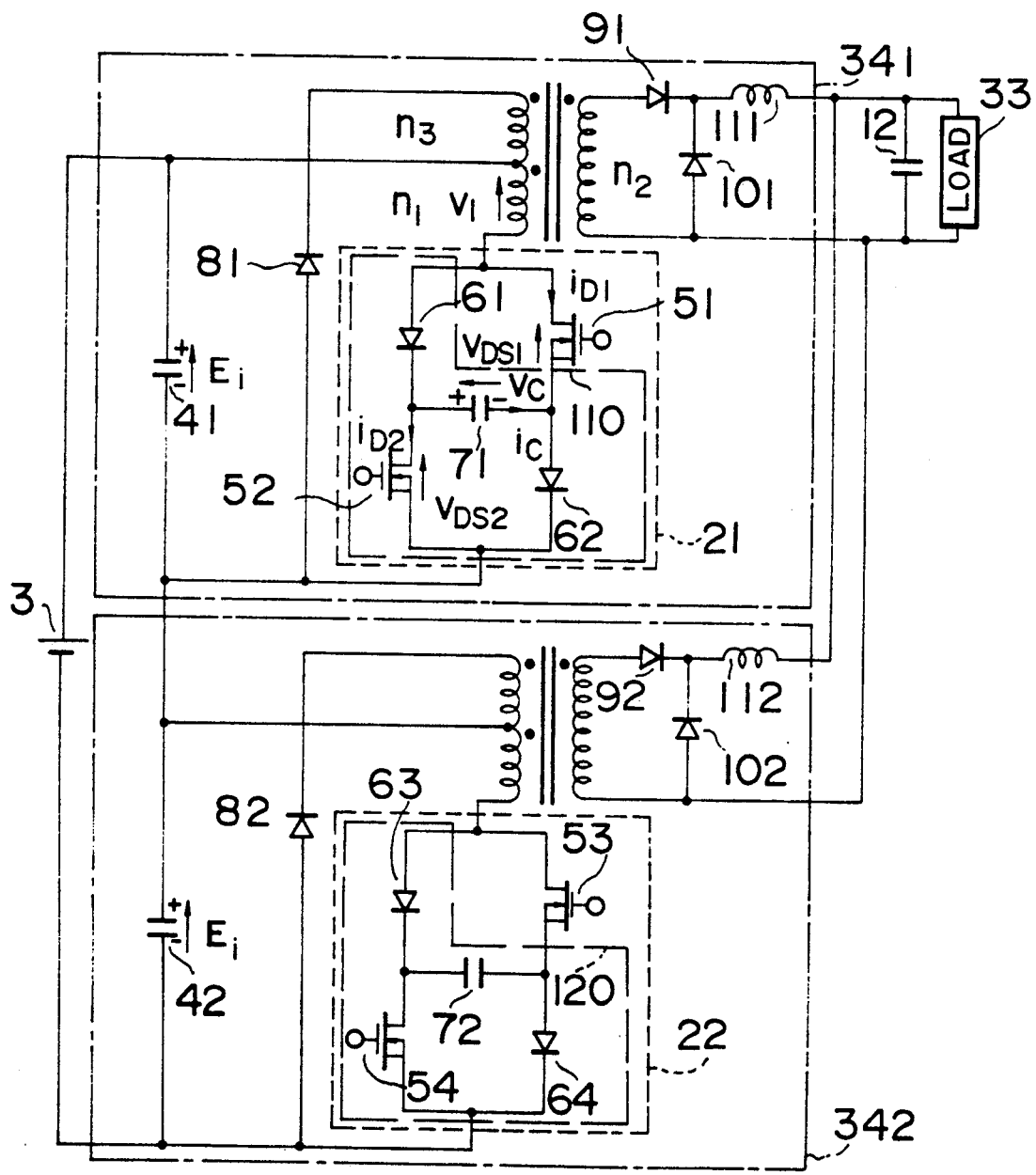
FIG. 2 is a circuit schematic of one embodiment of the present invention.

FIG. 2 is a circuit schematic of one embodiment of a DC-DC converter according to the present invention. In FIG. 2, reference numeral 3 denotes a DC voltage source; 41, 42, a capacitor dividing the voltage source; 51 to 54, a MOS FET; 61 to 64, a diode; 71, 72, a capacitor; 81, 82, a feedback diode; 91, 92, a rectifying diode; 101, 102, a flywheel diode; 111, 112, an output smoothing reactor; 12, an output smoothing capacitor; and 33, a load. Reference numerals 110, 120 denote a snubber circuit; 21, 22, a switching circuit; 341, 342, single end forward converters which use source dividing capacitors 41, 42, respectively, as the DC voltage source. The outputs of the two converters are connected in parallel and they perform similar operations. In the conventional single end forward converter, the switching circuits 21 and 22 each comprise a single switching element.

Figure 3:
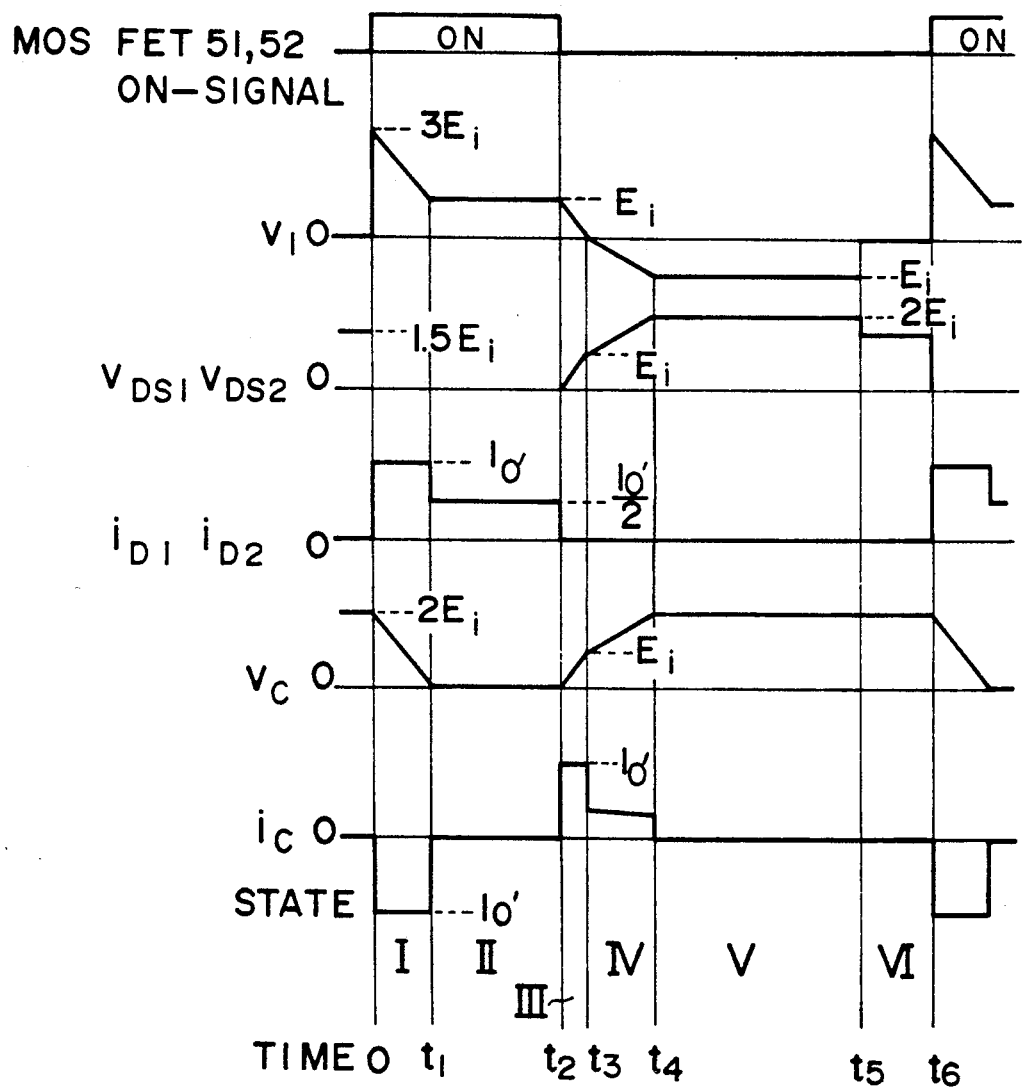
FIG. 3 illustrates the operation waveforms at the associated portions of the circuit of FIG. 2.
Figure 4:
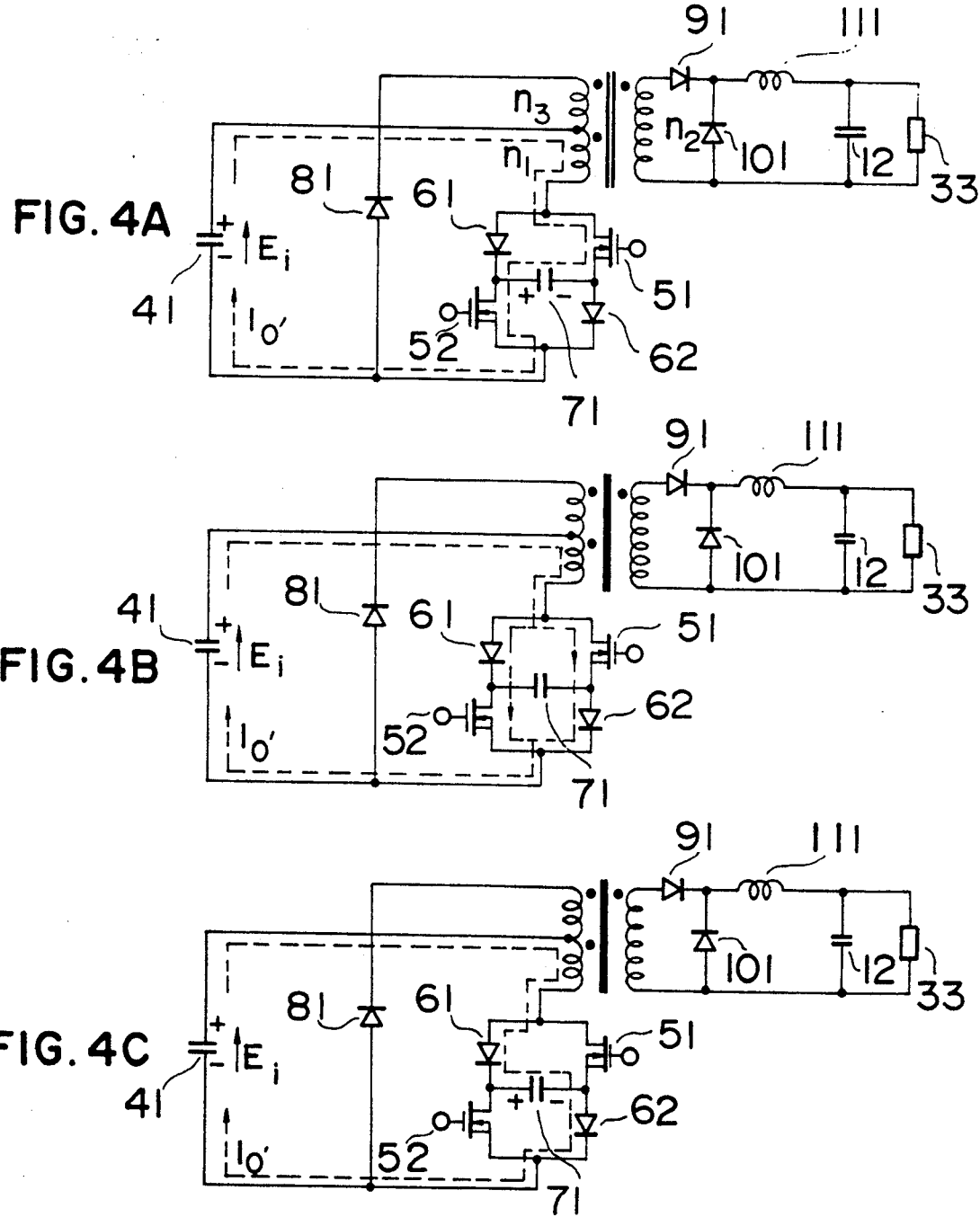
FIGS. 4A-4C shows a path of a current flowing through the FIG. 2 circuit.

FIG. 3 illustrates the operation waveforms of the associated portions of the FIG. 2 circuit. FIG. 3 shows that the number of turns $n_1$ of the primary winding of the transformer is equal to the number of turns $n_3$ of its reset winding when the secondary side overlap interval is ignored. As shown in FIG. 3, one cycle includes states I-VI. The definition of symbols for voltage and currents in FIG. 3 is shown in FIG. 2.

FIGS. 4A-4C show a path of the primary side current flowing through a part of single end forward converter 341 of the FIG. 2 circuit. It also shows a path of a current in the state I of FIG. 3; FIG. 4B, a path in state II, and FIG. 4C, a path in state III. Like numerals are used to denote like elements in FIGS. 4A-4C and 2.

The operation of the FIG. 2 circuit will be described using FIG. 3 and FIG. 4A-4C.

First, at a time $t=0$, the voltage $V_c$ across capacitor 71 is twice the voltage $E_i$ across source dividing capacitor 41 to be described later too. Assume that MOS FETs 51 and 52 are turned on simultaneously. As shown in FIG. 4A, since the voltage $V_c$ across capacitor 71 takes the polarity shown, diodes 61 and 62 are off, so that the primary-side current $I_0'$ flows through MOS FET 51, capacitor 71 and MOS FET 52 in the switching circuit 21. Simultaneously, capacitor 71 discharges due to primary-side current $I_0'$. Thus the energy stored in capacitor 71 is transmitted to the load and no loss occurs. Capacitors 41 and 71 are connected in series such that the voltages across the capacitors are combined additively. The primary-side current $I_0'$ is a primary side conversion value of a substantially constant current $I_0$ flowing through output smoothing reactor

111. The voltage $V_1$ across the primary winding of the transformer decreases to Ei from the sum 3Ei of the voltage Ei across capacitor 41 and the initial voltage 2Ei across capacitor 71 as capacitor 71 discharges. On the secondary side, rectifying diode 91 is turned on while flywheel diode 101 is off. At a time $t=t_1$, after capacitor 71 has discharged completely, the primary side current $I_0'$ flows equally in two paths in switching circuit 21, as shown in FIG. 4B. Then, at a time $t=t_2$, MOS FETs 51 and 52 are turned off simultaneously at which time the primary side current $I_0'$ flows via diode 61, capacitor 71 and diode 62 in switching circuit 21, as shown in FIG. 4C, so that capacitor 71 is charged so as to have the polarity shown. At this time, capacitor 71 is connected in parallel with MOS FETs 51, 52 so as to act as a snubber for these switching elements. At a time $t=t_3$, the voltage $V_c$ across capacitor 71 arrives at the voltage El across source dividing capacitor 41 while the voltage $V_1$ across the primary winding $n_1$ of the transformer becomes 0 at which time rectifying diode 91 is turned off, flywheel diode 101 is turned on and hence the secondary side of the transformer is short-circuited. Then, capacitor 71 is charged with an exciting current flowing through the transformer, and the voltage across capacitor 71 increases to a value which is twice the voltage Ei across capacitor 41. At a time $t=t_4$, when capacitor 71 voltage $V_c$ arrives at that voltage, diode 81 is turned on to reset the magnetic flux of the transformer, and $V_c$ is clamped to 2Ei. At a time $t=t_5$, when the resetting of the transformer flux is completed, the voltage $V_1$ across the primary winding $n_1$ of the transformer becomes 0.

As mentioned above, when MOS FETs 51, 52 are off, capacitor 71 is connected in parallel with MOS FETs 51 and 52. Thus, the current which has flowed so far through MOS FETs 51 and 52 is commutated to capacitor 71 and the voltage $V_c$ across capacitor 71 increases slowly at a rate given by $$dVc/dt = I_0'/C \ldots \quad (1)$$

where C is the capacitance of capacitor 71. Therefore, little turn-off loss of MOS FETs 51 and 52 occurs. The energy stored in capacitor 71 is transmitted to the load after MOS FETs 51 and 52 are turned on and no loss occurs. Switching circuit 21 includes a lossless snubber circuit 110. Thus, according to the present embodiment, the switching loss is reduced without producing a new loss, so that an increased-frequency operation, miniaturization, and an increased-efficiency of the DC-DC converter are achieved.

Figure 5:
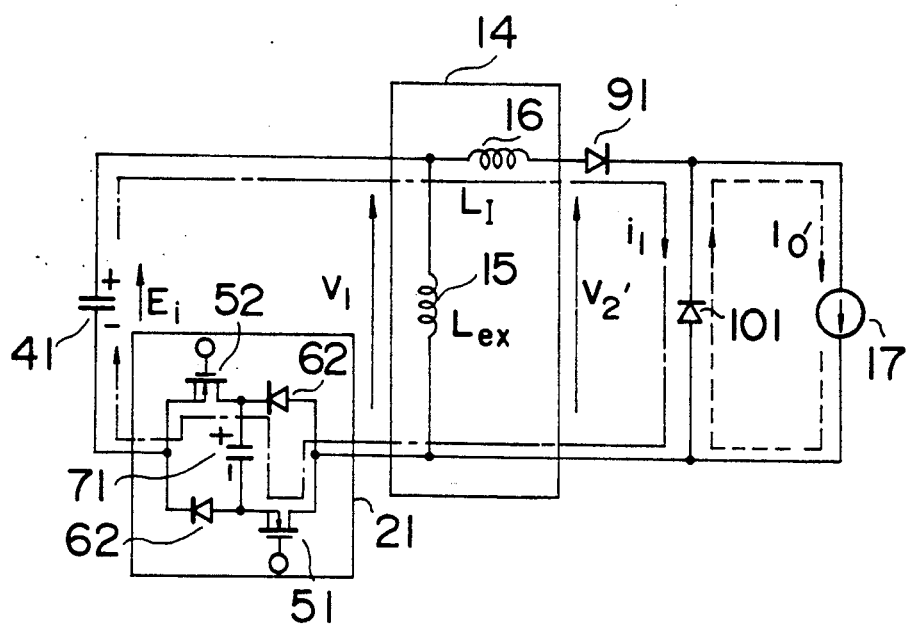
FIG. 5 is an equivalent circuit of the FIG. 2 circuit concerning the secondary side overlap interval.
Figure 6:
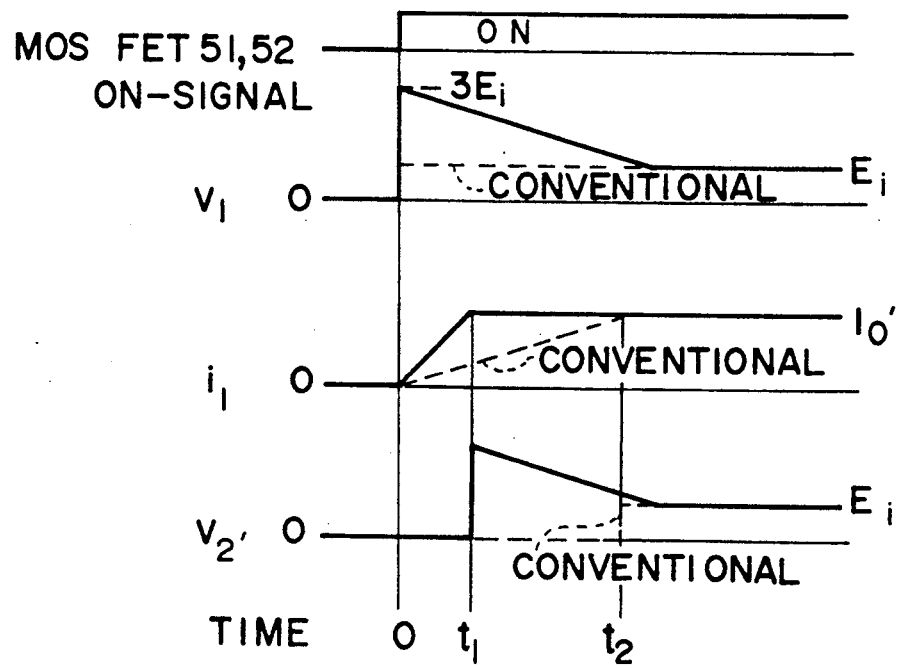
FIG. 6 illustrates the operation waveforms at the associated portions of the circuit of FIG. 5.

FIGS. 5 and 6 illustrate a reduction in the secondary side overlap interval. FIG. 5 is an equivalent circuit of single end forward converter 341 of FIG. 2 concerning the secondary side overlap interval. All the voltage and currents are converted to corresponding primary side values. Reference numeral 14 denotes an equivalent circuit of the transformer; 15, an exciting inductance of the transformer; 16, a leakage inductance of the transformer; and 17, a DC current source. The secondary side lead inductance of the transformer is equivalent to the leakage inductance of the transformer and is included in the leakage inductance. Like numerals are used to show like elements in FIGS. 5, 6 and 2. DC current source 17 simulates output smoothing reactor 111 of FIG. 2. FIG. 6 shows the operation waveforms of the voltage and currents at the associated portions of the circuit of FIG. 5.

The operation of the circuit of FIG. 5 will be described with reference to FIG. 6. At a time $t=0$, primary side current $i_1$ is 0 and a current $I_0'$ flows from DC current source 17 through flywheel diode 101. When MOS FETs 51 and 52 are turned on, primary side current $i_1$ flows through a path shown in FIG. 5 and increases slowly at a rate given by $$di_1/dt \approx 3Ei/L_I \ldots \quad (2)$$

where $L_I$ is a leakage inductance 16 of transformer 14. Flywheel diode 101 continues to be on until primary side current $i_1$ arrives at current $I_0'$ flowing through DC current source 17. Thus, secondary side voltage $V_2'$ is maintained at 0 although primary winding voltage $V_1$ of the transformer is not 0. This interval is a secondary side overlap interval T given by $$T = I_0'/(di_1/dt) \ldots \quad (3)$$

The relationship between the substantially constant current $I_0$ of reactor 111 and $I_0'$ which is the primary side conversion value of $I_0$ is given by $$I_0'' = I_0'/a \ldots \quad (4)$$

where a is the turn ratio (=the number of turns $n_1$ of the primary winding/the number of turns $n_2$ of the secondary winding) of the transformer. The relationship between $L_I$ and L is given by $$L_I = a^2 L \ldots \quad (5)$$

where L is the secondary side lead inductance, provided that the leakage inductance of the transformer is 0 in order to simplify the discussion.

Substituting equations (2), (4) and (5) into equation (3)

$$T \approx aI_0L/(3E_i) \ldots \quad (6)$$

As will be seen from equation (6), the overlap interval T increases as the turn ratio of the transformer increases, the load current $I_0$ increases and the source voltage decreases.

In the conventional system, a single MOS FET is used instead of switching circuit 21, and the primary side current $i_1$ increases at a rate given by $$di_1/dt = E_i/L_I \ldots \quad (7)$$

because of the absence of capacitor 71.

In the inventive system overlap interval, the magnitude of the source voltage is three times that in the conventional system and the secondary side overlap interval is reduced by a factor of about ⅓ compared to the conventional system. Namely, in the present embodiment, at an early stage when the switching elements are turned on, a high voltage comprising the sum of the voltages across capacitors 41 and 71 is applied across the primary winding of the transformer to expedite a rise in the primary side current to thereby reduce the overlap interval. Therefore, in the present embodiment, the maximum on-duty is increased to thereby result in an increased-frequency operation, miniaturization and increased-efficiency operation of the DC-DC converter. This effect increases as a lower-voltage larger-current output source is used.

Power sources in which the secondary side overlap interval is especially a hindrance to providing a high-frequency operation and miniaturization are low-voltage high-current output power sources for computers. These sources are miniaturized and lightened by using a DC-DC converter of the present system.

It will be explained that no power source short-circuiting occurs in the FIG. 2 embodiment. In FIG. 2, assume that all MOS FETs 51 to 54 are turned on simultaneously. The primary winding or load of the transformer is necessarily inserted in the closed loop comprising DC voltage source 3 and MOS FETs 51 to 54. Thus, no short-circuiting of the power source occurs. Therefore, in the FIG. 2 converter, no dead time for prevention of power source short-circuiting is required between MOS FETs 51, 52 and 53, 54. Thus, in the present embodiment, the maximum on-duty is increased to thereby provide an increased-frequency operation, miniaturization, and an increased-efficiency operation of the DC-DC converter.

While in the embodiment the number of turns $n_1$ of the primary winding and the number of turns $n_3$ of the reset winding of the transformer are assumed to be equal to each other, they are not necessarily required to be so. If $n_3 > n_1$, the maximum on-duty can be increased by a factor of 50% or more.

Switching circuit 21 is applicable to other DC-DC converters of a half bridge type and of a full bridge type. Also, in this case, the switching loss and secondary side overlap interval are reduced.

Figure 7:
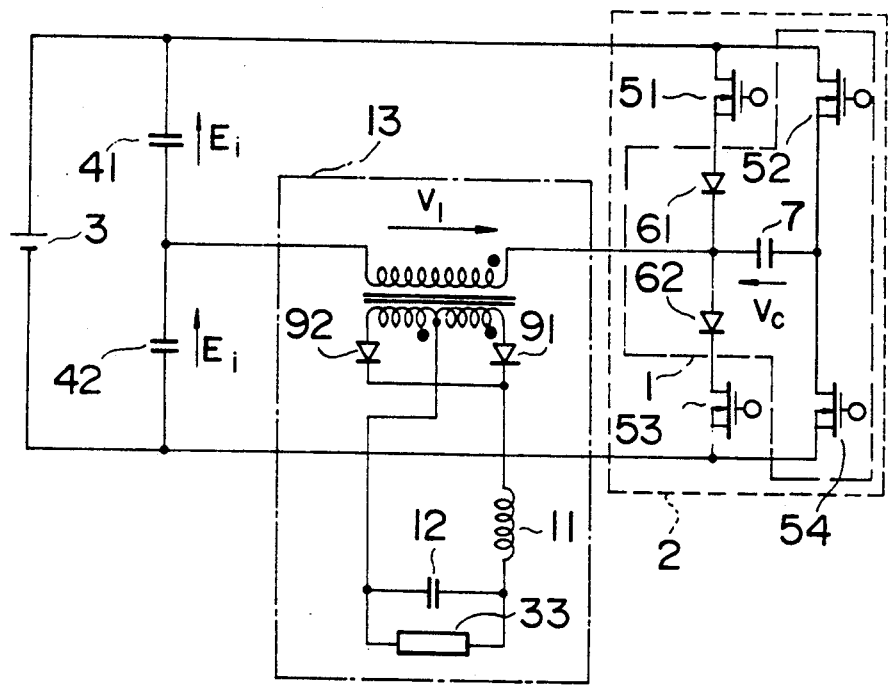
FIG. 7 is a circuit schematic of another embodiment of the present invention.

FIG. 7 shows the circuit structure of a DC-DC converter of another embodiment of the present invention. Reference numeral 13 denotes a load circuit. In FIGS. 7 and 2, like numerals are used to indicate like elements. The circuit of FIG. 7 is basically of a half bridge type and uses a switching circuit 2 comprising two series connected switching elements.

Figure 8:
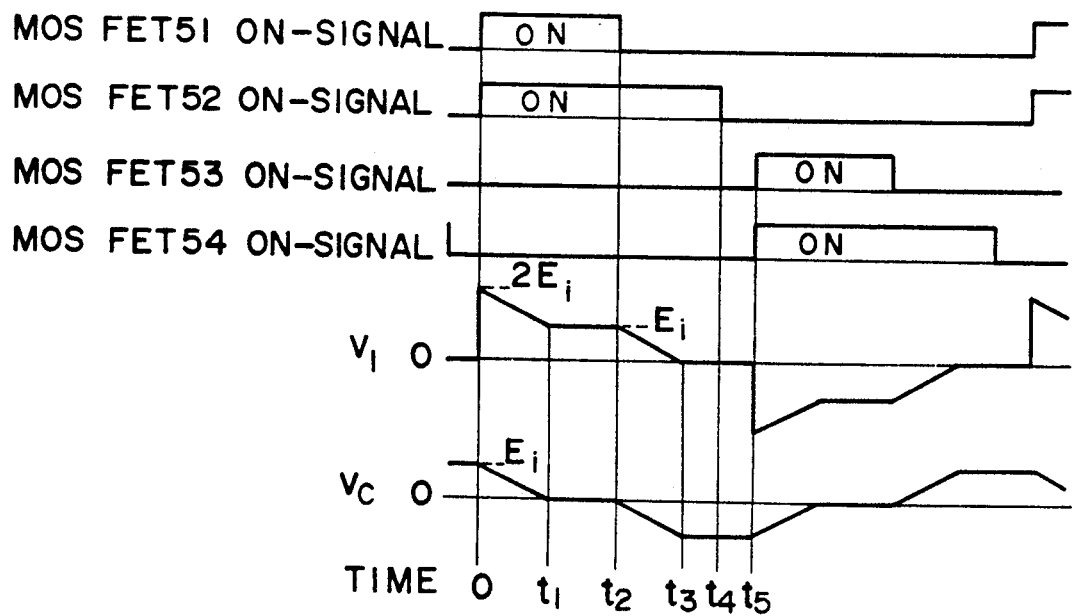
FIG. 8 illustrates the operation waveforms at the associated portions of the FIG. 7 circuit.

FIG. 8 shows the operation waveforms obtained from several elements of FIG. 7. The definition of voltage symbols in FIG. 8 is shown in FIG. 7.

The operation of the FIG. 7 circuit will be described with reference to FIG. 8.

At a time $t=0$, the voltage $V_c$ across capacitor 7 is equal to the voltage $E_i$ of source dividing capacitor 41. At this time, if MOS FETs 51 and 52 are turned on, diode 61 is backwardly biased with voltage $V_c$ across capacitor 7 and is off while the primary side current flows through MOS FET 52 and capacitor 7. At this time, capacitors 41 and 7 are connected in series such that their voltages are combined additively. The voltage $V_1$ across primary winding $n_1$ of the transformer decreases from $2E_i$ to $E_i$ as capacitor 7 discharges. After a time $t_1$ when voltage $V_c$ across capacitor 7 becomes 0, the primary side current flows through MOS FET 51 and diode 61. At a time $t_2$ when MOS FET 51 is turned off, the primary side current flows through MOS FET 52 and capacitor 7. Simultaneously, capacitor 7 is charged. At a time $t_3$ when voltage $V_c$ across capacitor 7 arrives at $-E_i$, rectifying diodes 91 and 92 are turned off and the primary side current becomes 0. An off signal to MOS FET 52 is applied after $t_3$. The above operation is performed for a half cycle from time $0-t_5$. The next half cycle operation corresponds to the symmetry of the circuit.

As described above, when MOS FET 51 is turned off, capacitor 7 is connected in parallel with the switching element so as to act as to snubber. When MOS FET 53 is turned off, capacitor 7 is connected in parallel with the switching element so as to act as a snubber. Therefore, little turn-off loss is produced in MOS FETs 51 and 53. The turning-off of MOS FET 52 or 54 brings about zero-voltage and zero-current switching, so that little turn-off loss is produced. The energy stored in capacitor 7 is not transmitted to the load. Switching circuit 2 includes a simple lossless snubber circuit 1. In the present embodiment, the switching loss is reduced, so that an increased-frequency operation, miniaturization and an increased-efficiency of the DC-DC converter is provided.

Directly after MOS FET 51 is turned on, a high voltage comprising the sum of voltages across capacitors 41 and 7 is applied across load 13. Directly after MOS FET 53 is turned on, a high voltage comprising the sum of voltages across capacitors 42 and 7 is applied across load circuit 13. Thus, in the present embodiment, the secondary side overlap interval of the transformer is reduced and an increased-frequency operation, miniaturization and an increased-efficiency operation of the converter are achieved.

The use of two switching circuits 2 allows modification to a full bridge type system. Also, in this case, effects similar to those mentioned above are produced.

Figure 9:
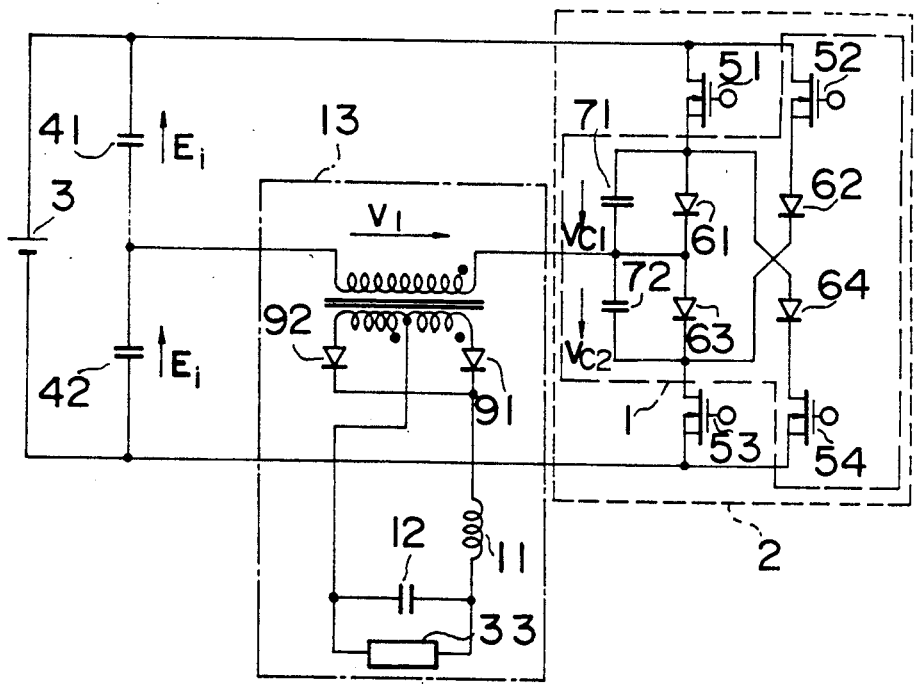
FIG. 9 is a circuit schematic of a further embodiment of the present invention.

FIG. 9 illustrates the circuit structure of a DC-DC converter of a further embodiment of the present invention. Like reference numerals are used to indicate like elements in FIGS. 9 and 7.

Figure 10:
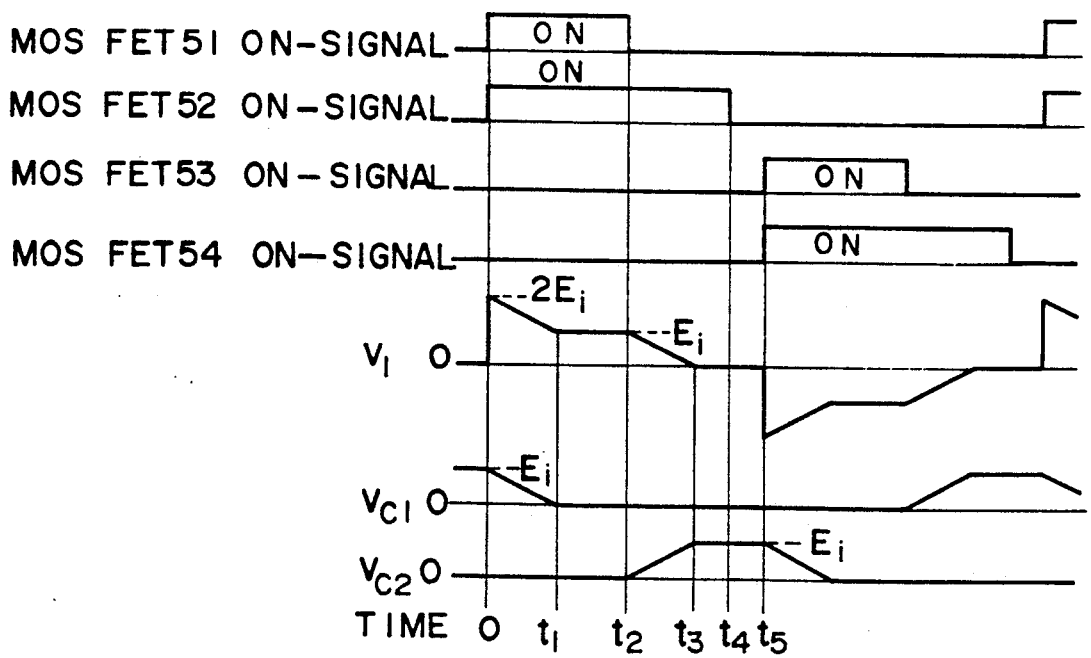
FIG. 10 illustrates the operation waveforms at the associated portions of the FIG. 9 circuit.

FIG. 10 illustrates the operation waveforms obtained at the associated elements in FIG. 9. The voltage symbols in FIG. 10 are defined in FIG. 9.

The operation of the FIG. 9 circuit will be described with reference to FIG. 10.

At a time 0, voltage $V_{c1}$ across capacitor 71 is equal to voltage $E_i$ across capacitor 41 while voltage $V_{c2}$ across capacitor 72 is 0. Assume that MOS FETs 51 and 52 are turned on simultaneously. Since diodes 61 and 62 are backwardly biased by voltage $V_{c1}$ across capacitor 71 and are maintained off, the primary side current flows through MOS FET 51 and capacitor 71. At this time, capacitors 41 and 71 are connected in series such that the respective voltages across the capacitors are combined additively. Simultaneously, the voltage $V_1$ across the primary winding $n_1$ of the transformer decreases from $2E_i$ to $E_i$ due to discharging of capacitor 71. After a time $t_1$ when the voltage $V_{c1}$ across capacitor 71 becomes 0, the primary side current flows through MOS FET 51 and diode 61. When MOS FET 51 is turned off at a time $t_2$, the primary side current flows through MOS FET 52, diode 62 and capacitor 72. Simultaneously, capacitor 72 is charged. Thereafter, at a time $t_3$, voltage $V_{c2}$ across capacitor 72 arrives at $E_i$, rectifying diodes 91 and 92 are turned off and the primary side current becomes 0. The above relates to the half cycle circuit operation ranging from time $0-t_5$. The operation for the next half cycle corresponds to the circuit symmetry.

As described above, when MOS FET 51 is turned off, capacitor 72 is connected in parallel with the switching element so as to act as a snubber. When MOS FET 53 is turned off, capacitor 71 is connected in parallel with the switching element so as to act as a snubber. Therefore, little turn-off loss is produced in MOS FETs 51 and 53. Since turning off of MOS FET 52 or 54 brings about zero-voltage and zero-current switching, little turn-off loss is produced. The energy stored in capacitors 71 and 72 is supplied to the load and no loss is produced. Switching circuit 2 includes a simple lossless snubber circuit 1. In the particular embodiment, switching loss is reduced, so that an increased-frequency operation, miniaturization and an increased-efficiency operation of the converter are achieved.

Directly after MOS FET 51 is turned on, a high voltage comprising the sum of voltages across capacitors 41 and 71 is applied across load 13. Directly after MOS FET 53 is turned on, a high voltage comprising the sum of voltages across capacitors 42 and 72 is applied across load circuit 13. Thus, in the present embodiment, the secondary side overlap interval of the transformer is reduced and an increased-frequency operation, miniaturization and an increased-efficiency operation of the converter are achieved.

The use of two switching circuits 2 allows modification to a full bridge type system. Also, in this case, effects similar to those mentioned above are produced.

In another view, the circuits of FIGS. 2, 7 and 9 are characterized in that the initial voltage applied across the load circuit becomes twice that of the DC voltage source directly after the switching element is turned on.

Figure 11A:
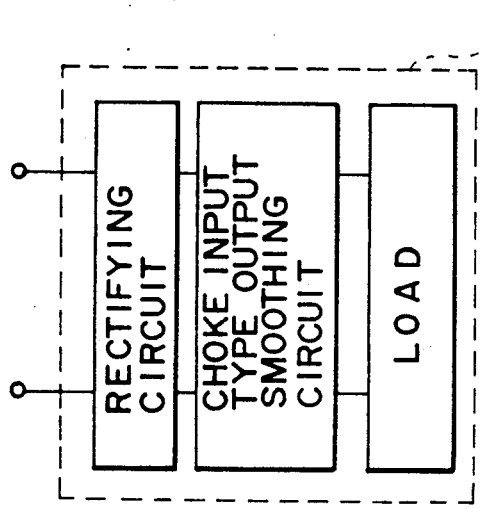
FIGS. 11A and 11B are a circuit schematic of an illustrative load circuit.
Figure 11B:
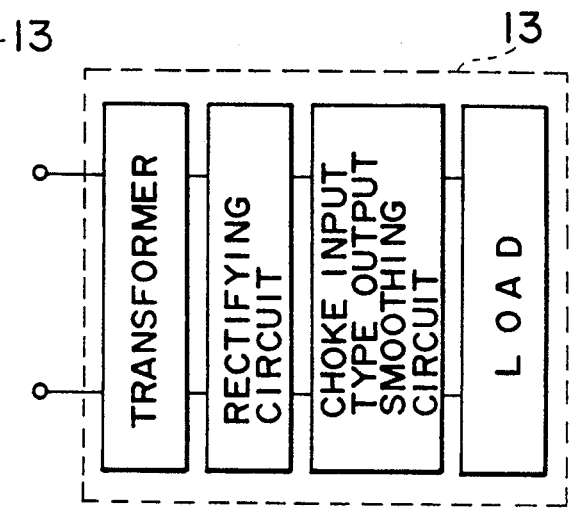

FIGS. 11A and 11B illustrate the structure of the load circuit. FIG. 11A illustratively shows that load circuit 13 includes at least a rectifying circuit, a choke input type output smoothing circuit and a load. In this case, commutation on the secondary side is suppressed by the lead inductance. FIG. 11B illustrates that load circuit 13 includes at least a transformer, a rectifying circuit, a choke input type output smoothing circuit and a load. In this case, commutation on the secondary side is suppressed by a leakage inductance of the transformer and the lead inductance. Any of the converters of the FIGS. 2, 7 and 9 embodiments is applicable to any of the load circuits in FIGS. 11A and 11B to reduce switching loss and the secondary side overlap interval.

Effects brought about by a reduction of the secondary side overlap interval will be described quantitatively. As an example, the FIG. 2 DC-DC converter will be taken. The secondary side overlap interval T increases as the turn ratio of the transformer increases, namely, as the input voltage increases and as the output voltage decreases, as shown by equation (6). Assume that the input voltage is a produced by rectifying the output of an AC 100-volt source, that the output voltage is 5 volts as required by TTL devices, that the total load current is 300A, that the leakage inductance of the transformer is 0, and that the leads from the secondary winding of the transformer include a very short length of 6 cm. Then, the parameters in equation (6) are approximately equal to $I_0 = 150A$ $a = 6$ $L = 0.06 \mu H$ $E_i = 70 V$ The secondary side overlap interval T is calculated to be about 0.26 $\mu s$ by using these values, while in the conventional system the secondary side overlap interval T is about 0.77 $\mu s$. When the operation frequency is 200 kHz, the secondary side overlap interval in the present embodiment is 5.2% of the period while it is 15.4% of the period in the conventional case. This also applies to other embodiments of the present invention. In other words, among converters in which the voltage from the DC voltage source is a produced by rectifying the output of an AC voltage source having a voltage of 100 volts or more, in which the operation frequency is 200 kHz or more, and in which the output voltage is 5 volts or less, only the converters of the FIG. 2, 7 and 9 embodiments can have a secondary side overlap interval which is 10% or less of the operation period.

Figure 12:
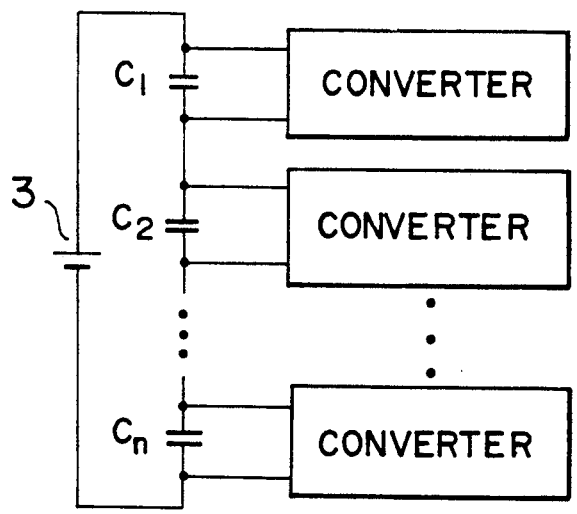
FIG. 12 is a circuit schematic of a further embodiment of the present invention.

FIG. 12 illustrates the circuit structure of a DC-DC converter of another embodiment of the present invention. A DC voltage source 3 is connected to a circuit of a plurality of power source dividing capacitors $C_1$-$C_n$ connected in series, each capacitor being connected to a corresponding converter such that the capacitor acts as a DC voltage source. Thus, a multiple output structure results. Each of the converters may include any of the embodiments mentioned above. As mentioned above, each converter achieves an increased-frequency operation, miniaturization and an increased efficiency operation. By employing such arrangement, the DC-DC converter is reduced in size and weight. Also, a breakdown voltage across the switching elements of each converter is reduced.

Figure 13A:
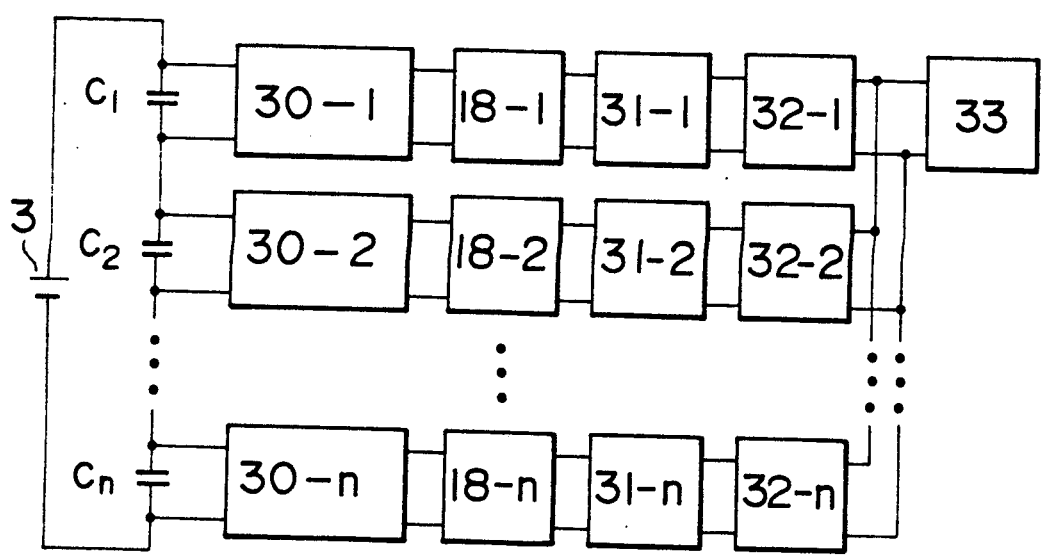
FIGS. 13A and 13B are a circuit schematic illustrating a parallel connection of converters.
Figure 13B:
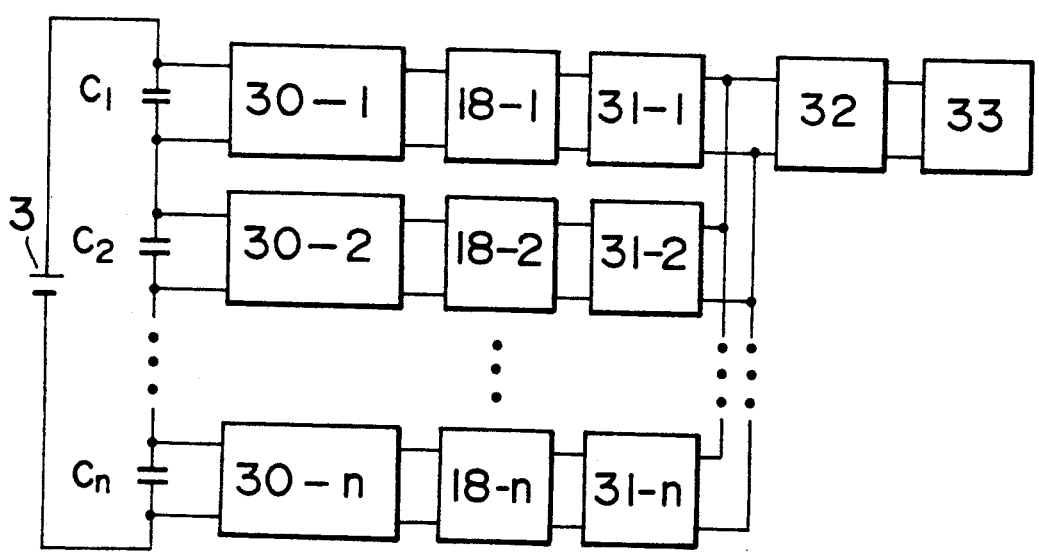

While in the FIG. 12 embodiment the multiple output structure is employed, a single output structure may be used. FIGS. 13A and 13B illustrate a parallel connection of converters. In FIGS. 13A and 13B, reference numerals 30-1 to 30-n each denote an inverter; 18-1 to 18-n, a transformer; 31-1 to 31-n, a rectifying circuit; 32-1 to 32-n, an output smoothing circuit; and 33, a load. DC voltage source 3 and power source dividing capacitors $C_1$-$C_n$ are similar in structure to those of FIG. 12. In FIG. 13A, the outputs of output smoothing circuits 32-1 to 32-n are connected in parallel. In this case, the output smoothing circuit capacitors may be replaced with a common one. The respective converters may be operated in any phase relationship. FIG. 13B illustrates a circuit structure in which the outputs of the circuits preceding output smoothing circuit 32 are connected in parallel. In this case, preferably, the respective converters are operated with a phase difference of 2/n where n is the number of converters connected in parallel, and employ any of the embodiments mentioned above. As mentioned above, each converter achieves an increased-frequency operation, miniaturization and an increased-efficiency operation. By employing such arrangement, the overall DC-DC converter is reduced in size and weight. The breakdown voltage of the switching elements of each converter is reduced.

Figure 14A:
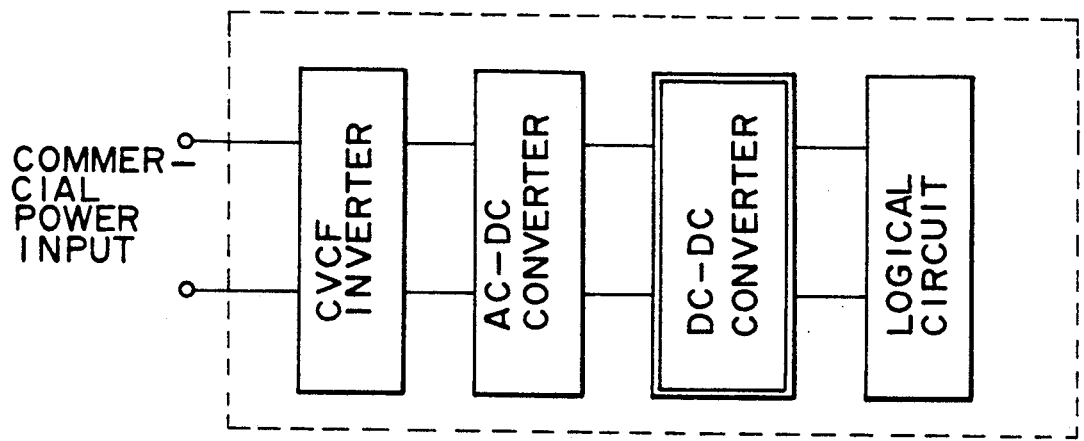
FIGS. 14A and 14B are a circuit schematic of a further embodiment the present invention.
Figure 14B:
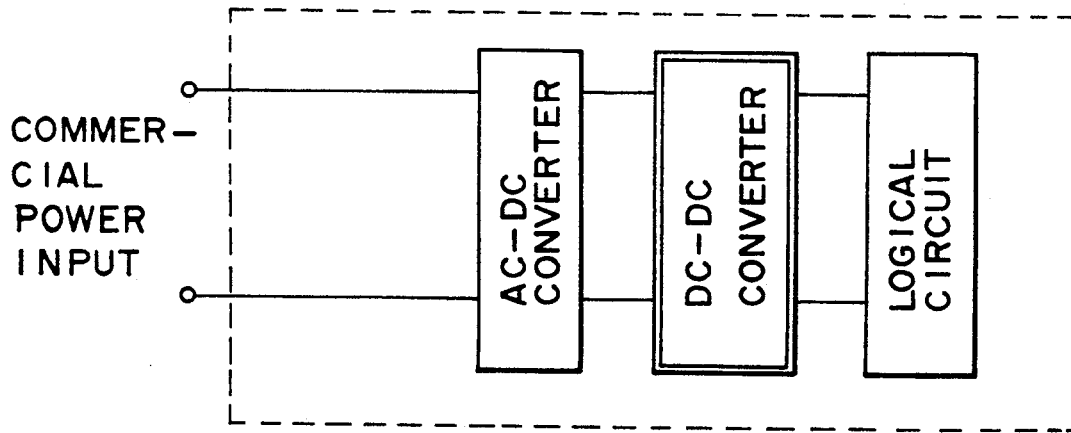

FIGS. 14A and 14B show a further embodiment of the present invention. As mentioned above, in the present invention, DC-DC converters of a lower-voltage higher-current output achieve an increased-frequency, miniaturization and an increased-efficiency operation. Typical of such a power source is a computer power source. FIG. 14A illustrates a computer which includes in cascade a CVCF (Constant Voltage Constant Frequency) inverter receiving power from a commercial power line, an AC-DC converter, a DC-DC converter and a logical circuit which receives a DC voltage of 5 volts or less. This arrangement is employed in a large-scaled computer. FIG. 14B has a structure obtained by eliminating the CVCF converter from the structure of FIG. 14A and is used for a small-scaled computer. In FIGS. 14A and 14B, if the DC-DC converter employs any of the FIGS. 2, 7, 9, 12 and 13A-13B converters, the computer will be reduced in size and weight.

Figure 15A:
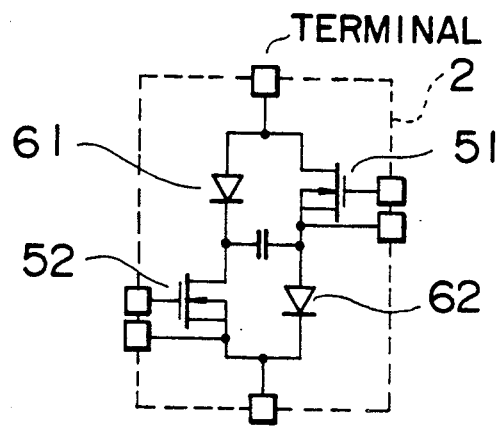
FIGS. 15A-15C are a circuit schematic of a still further embodiment of present invention.
Figure 15B:
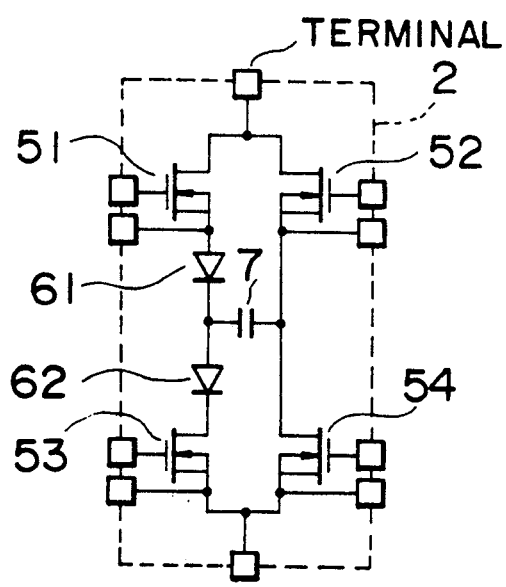
Figure 15C:
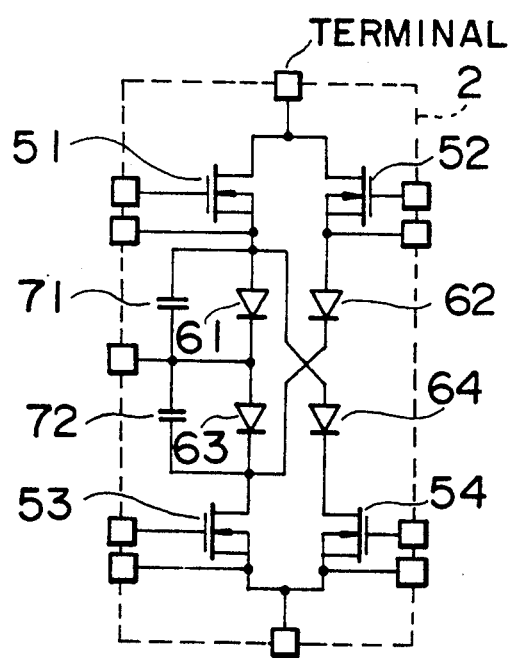

FIGS. 15A-15C show further embodiments of the present invention. FIGS. 15A-15C show modules constituting the corresponding switching circuits 2 of FIGS. 2, 7 and 9. By constituting each switching circuit using such a module, a miniaturized inexpensive switching circuit is provided. In addition, by employing such a module, the inventive DC-DC converters of FIGS. 2, 7 and 9 are reduced in size and cost.

Figure 16A:
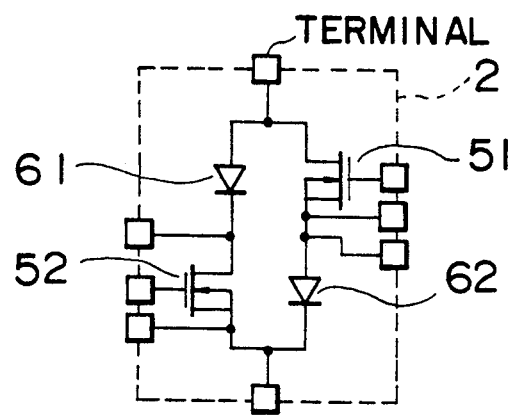
FIGS. 16A-16C are a circuit schematic of a further embodiment of the present invention.
Figure 16B:
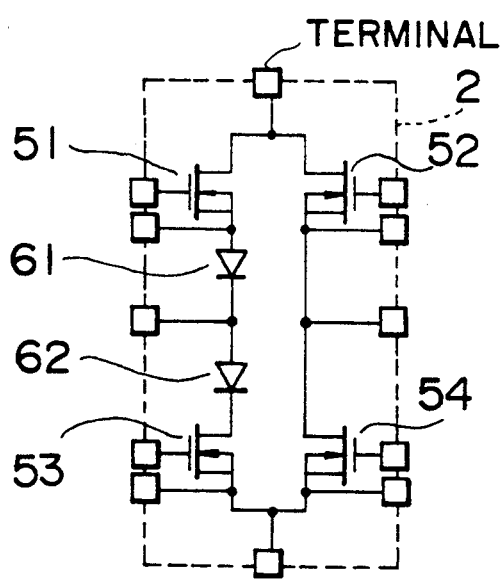
Figure 16C:
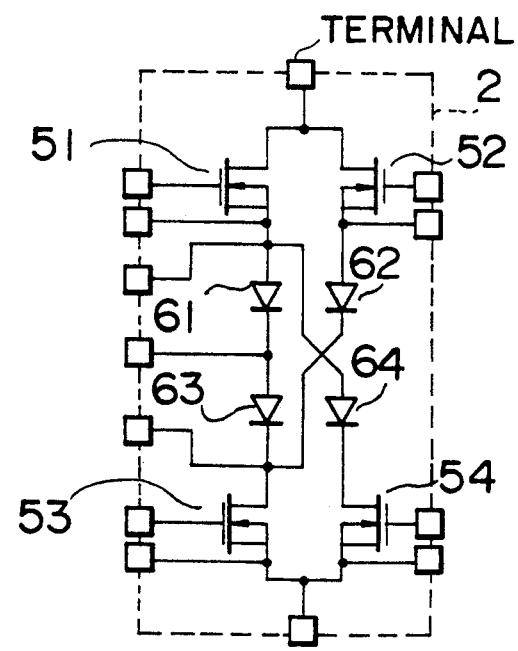

FIGS. 16A–16C illustrate further embodiments of the present invention. In the modules of FIGS. 15A–15C, integration of capacitors on the same substrate as ICs is difficult. The capacity of the capacitors differs according to the application and is preferably set by the user. FIGS. 16A–16C show ICs obtained by eliminating capacitors from the modules of FIGS. 15A–15C. Namely, FIGS. 16A–16C are ICs obtained by eliminating capacitors from the FIGS. 2, 7 and 9 switching circuits 2. By employing such an IC in a part of each of the switching circuits, the circuits are reduced in size and cost. By employing such an IC, the inventive DC-DC converters of FIGS. 2, 7 and 9 are further reduced in size and cost.

As mentioned above, according to the present invention, a switching circuit and a snubber circuit which is reduced in switching loss are realized, the secondary side overlap interval is reduced, and the dead time for prevention of source short-circuiting is eliminated. As a result, an increased-frequency operation, miniaturization and an increased-efficiency operation of DC-DC converters are realized easily. By use of the inventive DC-DC converters, power sources for computers are reduced in size to power sources third of the conventional ones.

We claim:

1. A DC-DC converter comprising a DC voltage source, a load circuit and a switching element connected in series, power being supplied to the load circuit by turning on and off the switching element, wherein the DC voltage source is connected in series with a capacitor through a diode when the switching element is turned off, and wherein the DC voltage source and the capacitor are connected in series through the switching element when the switching element is turned on such that the respective voltages across the DC voltage source and the capacitor are combined additively.

2. A DC-DC converter across to claim 1, wherein the load circuit includes at least a rectifying circuit, a choke input type output smoothing circuit and a load.

3. A DC-DC converter according to claim 1, wherein the load circuit includes at least a transformer, a rectifying circuit, a choke input type output smoothing circuit and a load.

4. A DC-DC converter comprising a DC voltage source, a load circuit, and a switching circuit including a main switching element and an auxiliary switching element connected in parallel, the DC voltage source, the load circuit, and the switching circuit being connected in series, power being supplied to the load circuit by turning on and off the main switching element, wherein the auxiliary switching element is connected in series with a first capacitor when the main switching element is turned off, and wherein the Dc voltage source is connected in series with a second capacitor when the main switching element is turned on such that the respective voltages across the DC voltage source and the second capacitor are combined additively.

5. A DC-DC converter according to claim 4, wherein the load circuit includes at least a rectifying circuit, a choke input type output smoothing circuit and a load.

6. A DC-DC converter according to claim 4, wherein the load circuit includes at least a transformer, a rectifying circuit, a choke input type output smoothing circuit and a load.

7. A DC-DC converter comprising a DC voltage source, a load circuit and a switching element connected in series, power being supplied to the load circuit by turning on and off the switching element, wherein immediately after the switching element is turned on, the initial voltage applied across the load circuit is at least twice the voltage of the DC voltage source.

8. A DC-DC converter according to claim 7, wherein the load circuit includes at least a rectifying circuit, a choke input type output smoothing circuit and a load.

9. A DC-DC converter according to claim 7, wherein the load circuit includes at least a transformer, a rectifying circuit, a choke input type output smoothing circuit and a load.

10. A DC-DC converter comprising a DC voltage source producing a DC voltage by rectifying an AC voltage of at least 100 volts, a switching element operating at a frequency of at least 200 kHz, and a transformer, the DC voltage source, the switching element, and a primary winding of the transformer being connected in series, a rectifying circuit connected to a secondary winding of the transformer, the rectifying circuit supplying a DC voltage of at most 5 volts to a load, and means connected to the switching element for providing a commutation interval on the secondary side of the transformer occurring immediately after the switching element is turned on which is at most 10% of the period of the operating frequency of the switching element.

11. A DC-DC converter comprising a pluraltiy of capacitors connected in series, the series-connected capacitors being connected in parallel with a DC source, a plurality of converters, each capacitor being connected to a corresponding one of the converters such that the capacitor operates as a DC voltage source for the converter, wherein each of the converters includes a switching element connected between the DC voltage source and a load circuit, power being supplied to the load circuit by turning on and off the switching element, and wherein in each converter an initial voltage applied across the load circuit immediately after the switching element is turned on is at least twice the voltage of the DC voltage source.

12. A DC-DC converter according to claim 11, wherein outputs of the converters are connected in parallel so as to provide power to, load circuit.

13. A computer comprising a plurality of capacitors connected in series, the series-connected capacitors being connected in parallel with an input DC source, the input DC source producing a DC voltage by converting a voltage of a commercial power source, a plurality of converters, each capacitor being connected to a corresponding one of the converters such that the capacitor operates as a DC voltage source for the converter, wherein each of the converters includes a switching element connected between the DC voltage source and a load circuit, the load circuit including computing means, power being supplied to the load circuit by turning on and off the switching element, and wherein in each converter an initial voltage applied across the load circuit immediately after the switching element is turned on is at least twice the voltage of the DC voltage source.

14. In a DC-Dc converter comprising a DC voltage source, a load circuit and a switching element connected in series, power being supplied to the load circuit by turning on and off the switching element, a snubber circuit wherein a capacitor is connected in parallel with the switching element when the switching element is turned off, and wherein the DC voltage source and the capacitor are connected in series while the capacitor discharges such that the respective voltages across the DC voltage source and the capacitor are combined additively.

15. In a DC-Dc converter comprising a first DC voltage source, a load circuit and a switching element connected in series, power being supplied to the load circuit by turning on and off the switching element, a snubber circuit wherein a first capacitor is connected in parallel with the switching element when the switching element is turned off, and wherein a second DC voltage source different from the first DC voltage source is connected in series with the first capacitor when the switching element is turned on such that the respective voltages across the second DC voltage source and the first capacitor are combined additively.

16. A DC-DC converter according to claim 15, wherein the second DC voltage source includes a second capacitor connected in parallel with the first DC voltage source.

17. A switching circuit comprising a first self-interrupting element having a cathode connected to an anode of a first diode, a second diode having a cathode connected to an anode of a second self-interrupting element, an anode of the first self-interrupting element being connected to an anode of the second diode, a cathode of the first diode being connected to a cathode of the second self-interrupting element, and a capacitor connecting the cathode of the first self-interrupting element to the anode of the second self-interrupting element, the anode of the first self-interrupting element and the cathode of the second self-interrupting element constituting an anode and a cathode, respectively, of an arm.

18. A switching circuit according to claim 17, wherein the switching circuit is constituted as an unit comprising a module.

19. A switching circuit according to claim 17, wherein the switching circuit except for the capacitor is part of an integrated circuit.

20. A switching circuit comprising a first series connected circuit of a first self-interrupting element and a first diode, a second series connected circuit of a second self-interrupting element and a second diode, a cathode of the first series connected circuit and an anode of the second series connected circuit being connected, to each other a third self-interrupting element having a cathode connected to an anode of a fourth self-interrupting element, an anode of the first series connected circuit being connected to an anode of the third self-interrupting element, a cathode of the second series connected circuit being connected to a cathode of the fourth self-interrupting element, a capacitor connecting the cathode of the first series connected circuit to the cathode of the third self-interrupting element, the anode and cathode of the first series connected circuit constituting an anode and a cathode, respectively, of an upper arm, the anode and cathode of the second series connected circuit constituting an anode and a cathode, respectively, of a lower arm.

21. A switching circuit according to claim 20, wherein the switching circuit is constituted as an unit comprising a module.

22. A switching circuit according to claim 20, wherein the switching circuit except for the capacitor is part of an integrated circuit.

23. A switching circuit comprising a first self-interrupting element having a cathode connected to an anode of a first diode, a cathode of the first diode being connected to an anode of a second diode, a cathode of the second diode being connected to an anode of a second self-interrupting element, a first series connected circuit of a third self-interrupting element and a third diode, an anode of the first self-interrupting element being connected to an anode of the first series connected circuit, the cathode of the second diode being connected to a cathode of the first series connected circuit, a second series connected circuit of a fourth self-interrupting element and a fourth diode, the anode of the first diode being connected to an anode of the second series circuit, a cathode of the second self-interrupting element being connected to a cathode of the second series connected circuit, the first diode and the second diode being connected in parallel with a respective capacitor, the anode of the first self-interrupting element and the cathode of the first diode constituting an anode and a cathode, respectively, of an upper arm, and the anode of the second diode and the cathode of the second self-interrupting element constituting an anode and a cathode, respectively, of a lower arm.

24. A switching circuit according to claim 23, wherein the switching circuit is constituted as an unit comprising a module.

25. A switching circuit according to claim 23, wherein the switching circuit except for the capacitor is part of an integrated circuit.

26. A single end forward converter comprising a DC voltage source, a primary winding of a transformer and a switching circuit connected in series, power being supplied to a load from a secondary winding of the transformer by turning on and off at least one self-interrupting element included in the switching circuit, the switching circuit being arranged such that a cathode of a first self-interrupting element is connected to an anode of a first diode, a cathode of a second diode is connected to an anode of a second self-interrupting element an anode of the first-interrupting element is connected to an anode of the second diode, a cathode of the first diode is connected to a cathode of the second self-interrupting element, a capacitor connects the cathode of the first self-interrupting element to the anode of the second self-interrupting element, and the anode of the first self-interrupting element and the cathode of the second self-interrupting element constitute an anode and a cathode, respectively, of the switching circuit.

27. A single end forward converter according to claim 26, wherein the transformer is resettable by operation of a reset circuit even if an on-duty ratio of the at least one self-interrupting element is at least 50%.

* * * * *